United States Patent [19]

Kojima et al.

[11] 4,152,726

[45] May 1, 1979

[54] RECORD DISK AND METHOD FOR PRODUCING THE SAME WITH CONSTANT WIDTH GROOVE

[75] Inventors: Chiaki Kojima, Yokohama; Yuzuru Yanagisawa, Fujisawa; Takashi Otobe, Yokohama; Hiroshi Ohki, Tokyo, all of Japan

[73] Assignee: Sony Corporation, Tokyo, Japan

[21] Appl. No.: 710,098

[22] Filed: Jul. 30, 1976

Related U.S. Application Data

[63] Continuation-in-part of Ser. No. 677,546, Apr. 16, 1976, abandoned.

[51] Int. Cl.² .......................... H04N 5/76; G11B 7/00
[52] U.S. Cl. ............................. 358/128; 179/100.3 V; 179/100.4 C; 346/76 L
[58] Field of Search .................. 179/100.3 V, 100.3 R, 179/100.4 C, 100.4 R; 358/128, 130, 132, 302, 297, 129, 127, 296, 299; 340/173 TP; 346/76 L, 108; 96/27 H, 35; 274/41.6 R, 41.6 PP; 235/61.12 R; 365/215

[56] References Cited

U.S. PATENT DOCUMENTS

| 3,558,208 | 1/1971 | Hudson | 346/108 |
|---|---|---|---|
| 3,737,589 | 6/1973 | Redlich | 179/100.3 V |
| 3,800,099 | 3/1974 | Dickopp | 179/100.3 V |
| 3,894,179 | 7/1975 | Jacobs | 179/100.3 V |
| 3,952,146 | 4/1976 | Plows | 179/100.4 C |
| 4,027,330 | 5/1977 | Maslowski | 179/100.3 V |

OTHER PUBLICATIONS

Communication Systems, by A. B. Carlson, ©1968 by McGraw-Hill, Inc., pp. 136–138.

*Primary Examiner*—Bernard Konick
*Assistant Examiner*—Alan Faber
*Attorney, Agent, or Firm*—Lewis H. Eslinger; Alvin Sinderbrand

[57] ABSTRACT

In a record disk having a spiral groove in a surface thereof with the depth of the groove varying along the latter for representing recorded information, such as video signals; the groove has an inverted bell-shaped cross-section which is symmetrical about the median of the groove with each of the opposite side surfaces of the groove, at any location therealong, being defined approximately by the equation $$d_x = d_0 \cdot \exp[-(x/w)^2]$$

in which $d_0$ is the depth of the groove at the median thereof, w is the distance from the median of the groove to the point at the side surface of the groove where the depth is $d_0/e$ (e being the base of the natural logarithm), and $d_x$ is the depth of the groove at the respective side surface at a distance x from the median. The foregoing record disk is conveniently molded in correspondence with an original recording disk produced by directing a laser light beam which has a Gaussian energy distribution thereacross against a layer of positive type photoresist material on the original recording disk while the latter and the light beam are moved relative to each other for scanning a spiral track of constant pitch on the original recording disk and while the intensity of the laser light beam is modulated by the information signals to be recorded, and then developing the layer of photoresist material.

7 Claims, 7 Drawing Figures

RECORD DISK AND METHOD FOR PRODUCING THE SAME WITH CONSTANT WIDTH GROOVE

CROSS REFERENCE TO RELATED APPLICATION

This applicaton is a continuation-in-part of the copending U.S. patent application Ser. No. 677,546, filed Apr. 16, 1976, now abandoned.

BACKGROUND OF THE INVENTION

1. Field of the Invention

This invention relates generally to record disks, and more particularly is directed to an improved record disk which may be conveniently mass produced and which has a spiral groove in its surface with the depth of such groove varying therealong for representing the recorded information or signals.

2. Description of the Prior Art

The disk recording of audio signals is well known, and involves the use of a lacquer disk for the original recording. Such original lacquer disk, usually constituted by an aluminum base plate with a coating of acetate plastic thereon, is placed on a recording turntable which is rotated at a suitably slow standard speed for audio recording, for example, 33⅓, 45 or 78 r.p.m. During the rotation of the lacquer disk, a cutter including an electromechanical transducer and a cutting stylus is driven in the radial direction of the turntable by means of a lead screw so that the cutting stylus cuts a spiral groove of constant pitch in the acetate plastic coating. As the spiral groove is being cut, electrical signals corresponding to the audio or sound information to be recorded are applied to a driving coil of the cutter transducer for effecting corresponding vibrations of the cutting stylus with the result that undulations are formed in the spiral groove to represent the recorded information or signals. In mass producing phonograph record disks from such original lacquer disk, the latter is metallized and then electroplated, whereupon the plating is separated from the original lacquer disk and reenforced by backing with a solid metal plate to produce the so-called master. Thereafter, by well-known steps, a mother and then a stamper are produced from the master, whereupon, the stamper is employed in a hydraulic press for molding successive phonograph records from preforms or biscuits of thermoplastic material, with each such phonograph record having a modulated spiral groove in its surface corresponding to the groove formed in the respective original lacquer disk.

When phonograph records are produced in the conventional manner described above, the speed of rotation of the original lacquer disk during the cutting of the spiral groove therein is relatively slow so that an adequate playing time can be achieved even if the pitch of the spiral groove is large enougth to ensure that adjacent turns of the spiral groove will not interfere or extend into each other whether the recorded signals are represented by lateral undulations in the groove or variations in the depth of the latter.

Recently, it has been proposed to record video signals as variations in the depth of a spiral groove formed in the surface of a record disk by a method similar to that described above for the recording of audio signals. If the resulting video record disk is to have one frame of the video signals recorded in each turn of its spiral groove, it will be necessary, during reproducing of the recorded video signals, to rotate the video record disk at a high speed, for example, 1800 r.p.m. in the case of NTSC video signals, from which it follows that the spiral groove of the record disk must have 1800 turns for each minute of its playing time. Therefore, if a video record disk of reasonable diameter is to be provided with a substantial playing time, for example of 30 minutes, the pitch of the spiral groove has to be very small, for example, on the order of 3 to 4 microns. However, when the original recording of video signals is produced by the mechanical cutting of a spiral groove in the original lacquer disk, as described above, the cross-sectional configuration of the groove is constant, for example, is V-shaped with a constant apex angle, as determined by the shape of the cutting stylus. Therefore, as the depth of the groove is varied to represent the recorded video signals, the width of the groove at the surface of the record disk is correspondingly varied. By reason of the small pitch of the spiral groove required in recording video signals, the width of the groove of constant V-shaped cross-sectional configuration will exceed such small pitch, at least at the locations of maximum depth of the groove, with the result that adjacent turns of the spiral groove will interfere or extend into each other. In other words, at least at the locations of maximum depth of the groove, the adjacent side surfaces of successive turns of the spiral groove will intersect below the surface of the original lacquer disk in which the groove is being cut with the result that the height of the wall separating successive turns will vary. Moreover, it has been found that such variation of the height of the wall separating successive turns of the spiral groove in the video record disk undesirably affects the reproduction of the recorded video signals in that, during reproduction of the signals recorded as variations in the depth of the groove in one turn thereof, the reproduced signal may include cross-talk components from the next adjacent turns of the groove.

OBJECTS AND SUMMARY OF THE INVENTION

Accordingly, it is an object of this invention to provide a record disk having a spiral groove in its surface with the depth of the groove varying along the latter for representing video signals or other recorded information, and in which the above described problems encountered in the existing video record disk are eliminated.

More specifically, an object of this invention is to provide a record disk having a spiral groove of constant pitch with the depth of the groove varying along the latter for representing video signals or other recorded information, and in which the width of the groove at the surface of the record disk is substantially uniform along the groove so as to avoid the previously mentioned pickup of cross-talk components when reproducing the recorded video or other information signals.

In accordance with an aspect of this invention, in a record disk having a spiral groove of constant pitch opening at a surface of the disk with the depth of the groove varying along the latter for representing recorded video signals or other information, the groove has an inverted bell-shaped cross-section which varies in accordance with the variations in the depth of the groove so as to provide a substantially uniform width of the groove at the opening of the latter.

More particularly, in a record disk according to this invention, each of the opposite side surfaces of the groove, at any location therealong, is defined approximately by the equation $$d_x = d_o \cdot \exp[-(x/w)^2]$$

in which $d_o$ is the depth of the groove at its median, $w$ is the distance from the median of the groove to the point at the side surface of the groove where the depth is $d_o/e$ (e being the base of the natural logarithm), and $d_x$ is the depth of the groove at the respective side surface at a distance x from such median.

A record disk according to this invention, as aforesaid, is conveniently molded in correspondence with an original recording disk produced by the method disclosed in detail in U.S. patent application Ser. No. 648,006, filed Jan. 12, 1976, and having a common assignee herewith, that is, by directing a laser light beam against a layer of positive-type photo-resist material on the original recording disk while the latter and the light beam are moved relative to each other for scanning a spiral track of constant pitch on the original recording disk and while the intensity of the laser light beam is modulated by the video or other information signals to be recorded, and then developing the layer of photo-resist material so as to provide the desired spiral groove therein which has its depth varying to represent the recorded signals, but in which the laser light beam employed for exposing the photo-resist material has substantially a Gaussian distribution of laser light intensity across the beam for providing the resulting record disk with a spiral groove having the desired inverted bell-shaped cross-section.

More particularly, in producing a record disk according to this invention, as described above, the distribution of laser light intensity across the laser light beam is substantially in accordance with the equation $$I_r = I_o \cdot \exp[-(r/r)^2]$$

in which $I_r$ is the light intensity at a point spaced a radial distance r from the axis of the laser light beam, $I_o$ is the light intensity of the axis of the light beam, and R is the radius of the light beam at the region thereacross where the intensity is $I_o/e$ (e being the base of the natural logarithm).

The above and other objects, features and advantages of the invention will be apparent in the following detailed description of an illustrative embodiment thereof which is to be read in connection with the accompanying drawings.

DESCRIPTION OF A PREFERRED EMBODIMENT

Figure 1:
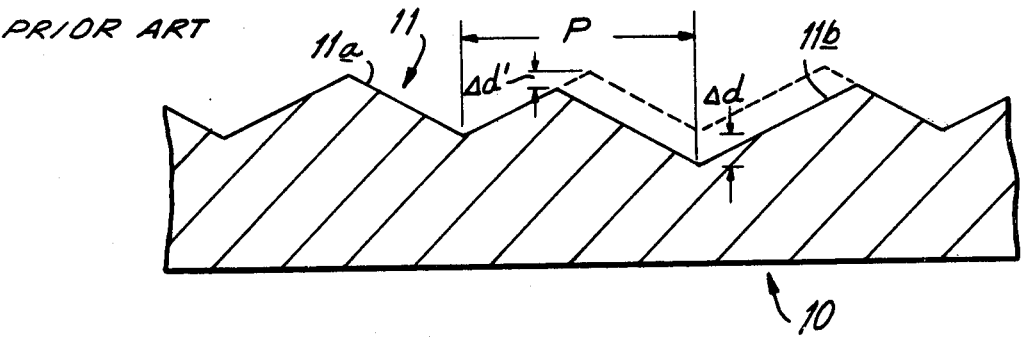
FIG. 1 is an enlarged, fragmentary sectional view of a record disk according to the prior art.

Referring to the drawings in detail, and initially to FIG. 1 thereof, it will be seen that, in a video record disk 10 produced in accordance with the prior art, that is, molded in correspondence with an original lacquer or recording disk having a spiral groove formed therein by a cutting stylus, the recorded video signals are represented by variations in the depth of a corresponding spiral groove 11 formed in a surface of record disk 10. Since the recording of the video signals was effected by the mechanical cutting action of a cutting stylus on the original lacquer or recording disk, as previously described herein, the cross-sectional configuration of groove 11 is constant, for example, is V-shaped with a constant apex angle, as determined by the shape of the cutting stylus. Therefore, as is apparent from a comparison of adjacent turns 11a and 11b of spiral groove 11 on FIG. 1, as the depth of the groove is varied to represent the recorded video signals, the width of the groove at the surface of the record disk 10 is correspondingly varied. By reason of the small constant pitch P of the spiral groove 11 required when recording video signals so as to obtain a reasonably long playing time for the record disk 10, the width of the groove of constant V-shaped cross-sectional configuration will exceed such small pitch P, at least at the locations of maximum depth of the groove, for example, as in the case of the turn 11b, with the result that the adjacent turns 11a and 11b will interfere or extend into each other. In other words, at least at the locations of maximum depth of the groove being cut in the original lacquer disk, the adjacent side surfaces of successive turns of the spiral groove will intersect below the surface of the original lacquer disk with the result that the height of the wall separating successive turns wil vary. Thus, as shown in FIG. 1, in the record disk 10 molded in correspondence with the original lacquer disk, an increase $\Delta d$ in the depth of turn 11b of groove 11 will be accompanied by a correspondingly substantial decrease $\Delta d'$ in the height of the wall separating the successive or next adjacent turns 11a and 11b. Such variation in the height of the wall separating the successive turns of spiral groove 11 undesirably affects the reproduction of the recorded video signals in that, during reproduction of the signals recorded as variations in the depth of the groove in one turn, for example, the turn 11a, the reproduced signal may include cross-talk components from the next adjacent turn 11b of groove 11.

Figure 2:
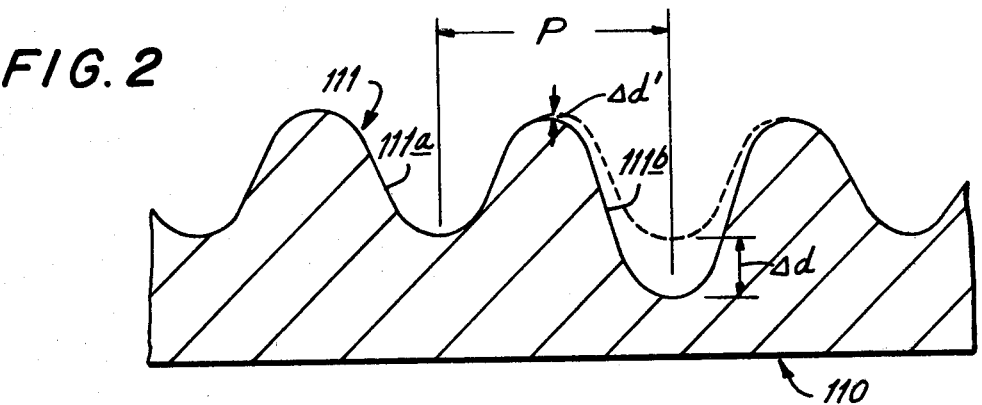
FIG. 2 is a fragmentary sectional view similar to that of FIG. 1, but showing a record disk according to the present invention.
Figure 7:
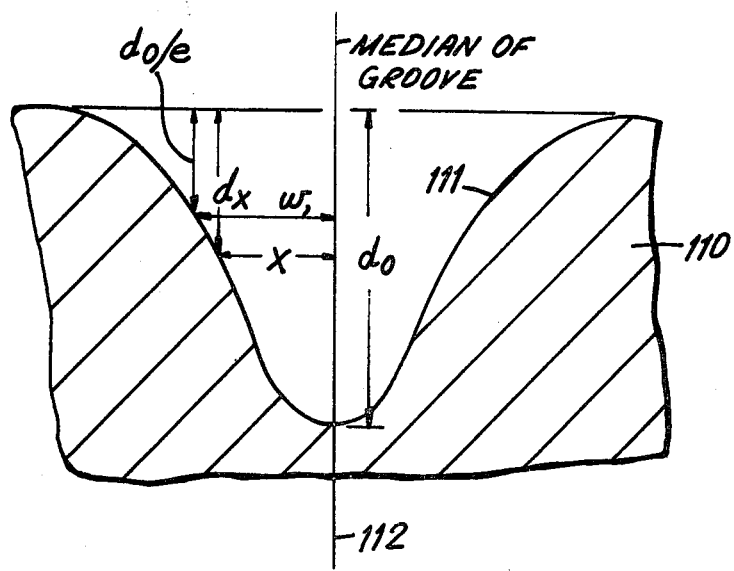
FIG. 7 is a further enlarged sectional view of the groove formed in a record disk in accordance with this invention.

Referring now to FIG. 2, it will be seen that, in a record disk 110 according to the present invention, the spiral groove 111 of constant pitch P which varies in its depth for representing the recorded video or other information signals has an inverted bell-shaped cross-section which varies in accordance with the variations in the depth of the groove 111 so as to provide a substantially uniform width of the groove at the opening of the latter. More particularly, as shown on FIG. 7, in the record disk 110 according to this invention, each of the opposite side surfaces of the groove 111, at any location therealong, is defined approximately by the equation $$d_x = d_o \cdot \exp[-(x/w)^2] \qquad (1)$$

in which $d_o$ is the depth of groove 111 at its median 112, w is the distance from the median 112 to the point at the side surface of groove 111 where the depth is $d_o/e$ (e being the base of the natural logarithm), and $d_x$ is the depth of the groove 111 at the respective side surface at a distance x from the median 112.

As a result of the foregoing cross-sectional configuration of the spiral groove 111 in the record disk according to this invention, a substantial increase $\Delta d$ in the depth of groove 111, for example, in the turn 111b thereof indicated on FIG. 2, is accompanied by a relatively insignificant decrease $\Delta d'$ in the height of the wall separating such turn 111b of the spiral groove from the next adjacent turn 111a. Thus, in the record disk 110 according to this invention, the spiral groove 111 may be given a small pitch P so as to provide a substantial playing time for the record even when video signals are recorded in such groove 111 as variations in the depth thereof, without causing significant variations in the height of the wall separating the successive turns of spiral groove 111. Therefore, video signals recorded in a record disk according to this invention can be reproduced, as by a pickup having a stylus engaged in groove 111 for responding to variations in the depth thereof, without encountering interference or cross-talk between the video signals recorded in next adjacent turns of the spiral groove.

Figure 3:
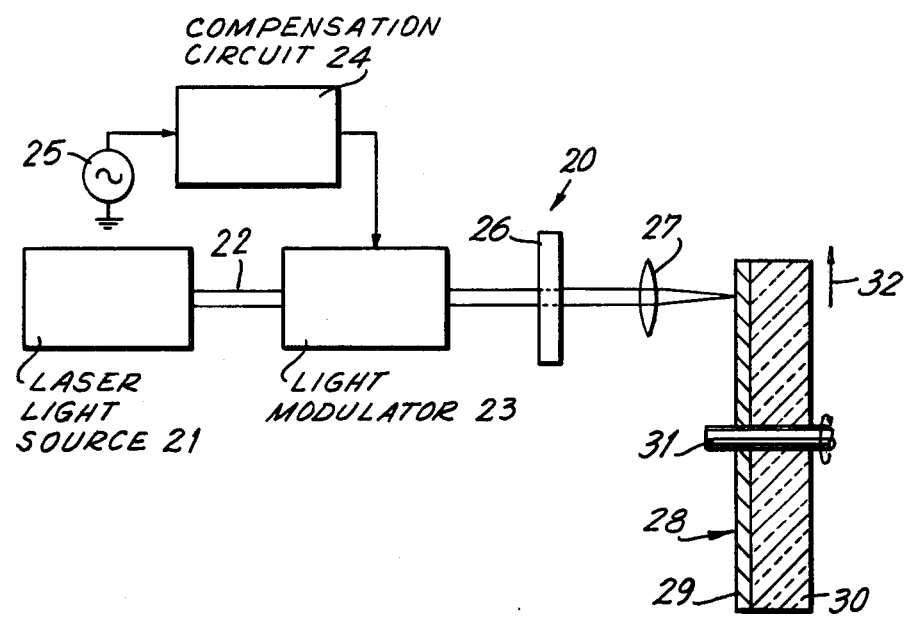
FIG. 3 is a schematic view illustrating the essential components of an apparatus that may be employed for producing an original recording of video or other signals from which record disks according to this invention may be formed.

The record disk 110 according to this invention may be conveniently molded in correspondence with an original recording disk which is produced by an optical recording method, for example, as generally disclosed in U.S. patent application Ser. No. 648,006, identified more fully above. As shown particularly on FIG. 3, in optically producing an original recording disk for use in forming corresponding record disks according to this invention, a laser light source 21 emits a laser light beam 22 of predetermined light intensity. The laser light beam 22 is directed through a light modulator 23 for modulating the intensity of the laser light beam in accordance with the signals to be recorded which are applied to the light modulator 23 through a compensation circuit 24 from a signal source 25, for example, a television camera. The compensation circuit 24 compensates for non-linearity in the photo-sensitive characteristics of the record medium, which is hereinafter described in detail, and in the modulation characteristics of light modulator 23. The modulated laser light beam issing from light modulator 23 is passed through a speed compensating filter 26 and then projected by a condensing lens 27 onto the substantially flat surface of a photo-sensitive record medium 28.

As shown, the record medium or original recording disk 28 may be constituted by a layer 29 of photo-sensitive material coated on the surface of a glass disk or base plate 30 and having a uniform thickness of about 1 micron. The disk 30 is fixed, at its center, on a shaft 31 which is rotated, for example, by an electric motor (not shown). Simultaneously with the rotation of shaft 31, and hence of original recording disk 28, disk 28 and laser light beam 22 are moved relative to each other in the radial direction of disk 28, for example, the shaft 31 may be progressively moved in the direction of the arrow 32 by a conventional lead screw mechanism (not shown), so that laser light beam 22 scans a spiral path or track on the surface of photo-sensitive layer 29.

It will be apparent that, even though original recording disk 28 is rotated at a constant speed, for example, 1800 r.p.m. when recording NTSC video signals, so as to record one frame of such video signals during each revolution of the original recording disk, the linear speed of the surface of photo-sensitive layer 29 varies over the radial extent of such surface from a minimum speed adjacent to the axis of rotation of original recording disk 28 to a maximum speed at the outer periphery of such disk. Thus, even if it is assumed that the laser light beam 22 is of constant intensity, the amount of light projected on a unit area of the photo-sensitive layer 19 disposed close to the axis of rotation would be substantially greater than the amount of light projected on a similar unit area of the photo-sensitive layer disposed adjacent the outer periphery of original recording disk 28. However, in the apparatus 20 shown in FIG. 3, the speed compensating filter 26, which may be in the form of a gray scale, is suitably controlled in accordance with the movement of the original recording disk 28 in the direction of the arrow 32 relative to the laser light beam 22 so as to progressively reduce the intensity of the laser light beam as the latter is directed against the surface of photo-sensitive layer 29 at locations that are progressively closer to the axis of rotation of the original recording disk. Thus, the effect of the varying linear speed at the surface of the photo-sensitive layer 29 is substantially eliminated.

The photo-sensitive layer 29 of the original recording disk 28 may be of a photo-resist material, such as, for example, the negative-type photo-resist material available under the tradename KOR from the Eastman Kodak Company and containing polycinnamicyinyl as a major constituent thereof, or the positive-type photo-resist material available under the designation Az-1350J from the Shipley Company, and which contains novolac resin as a major constituent thereof. It will be apparent that the degree to which each unit area of the photo-resist layer is light- or photo-reacted will depend upon the amount of light projected on such unit area by the laser light beam 22, and that the depth of photo-resist material which remains after developing in the case of the negative-type photo-resist, or which is removed upon developing in the case of the positive-type photo-resist will depend upon the degree to which such photo-resist material has been light- or photo-reacted.

It will be appreciated that, as the modulated laser light beam 22 scans a spiral track on the photo-resist layer 29 of original recording disk 28, the degree to which the photo-resist material is photo-reacted will be varied in correspondence with the modulation of the intensity of the laser light beam. After the photo-resist layer 29 has been thus exposed to light by the modulated laser light beam, such layer 29 is conventionally developed. In the case of the negative-type photo-resist layer, developing thereof results in the removal of the unexposed portions of the layer 29 while the light- or photo-reacted portion remains more or less undissolved in dependence on the degree or extent to which such portion has been photo-reacted. On the other hand, in the case of the positive-type photo-resist layer, developing thereof after its exposure to light results in the light- or photo-reacted portion of the layer being dissolved or removed to a depth in dependence on the degree to which such layer was photo-reacted, while the portions of the layer 29 which were not exposed to light remain undissolved by the developing process.

Figure 4:
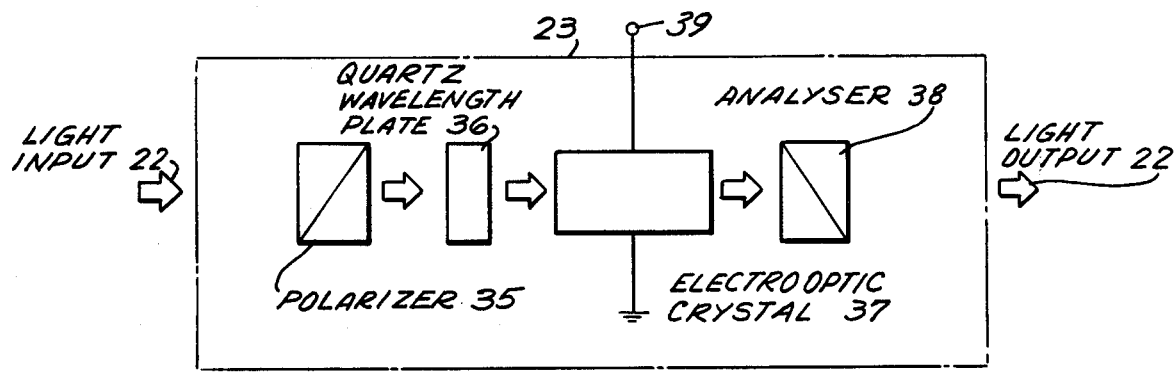
FIG. 4 is a schematic view illustrating the elements of a light modulator that may be employed in the apparatus of FIG. 3.

As shown particularly on FIG. 4, the light modulator 23 of the recording apparatus 20 may include a polarizer 35, a quartz wavelength plate or phase controller 36, an electro-optic crystal 37 and an analyzer 38 which are successively arranged in the order named in the path of the laser light beam 22. The electro-optic crystal 37 may be a crystal of lithium niobate, lithium tantalate or the like which exhibits the electro-optic or Pockels effect, and is connected to an input terminal 39 at which the video or other signals to be recorded are received from source 25 after compensation thereof in the circuit 24. Further, the polarizer 35 and analyzer 38 are in the condition of orthogonal nicol relative to each other so that, as is known, the intensity of the laser light beam issuing from modulator 23 can be made to correspond to the signal voltage being applied to electro-optic crystal 37.

As previously mentioned, if the photo-sensitive layer 29 of original recording disk 28 is formed of a positive-type photo-resist and the modulated laser light beam 22 scans a spiral path on the surface of such layer 29, then a reduced thickness of the photo-sensitive layer 29 will remain along such spiral path or track after the developing of the positive-type photo-resist. Thus, upon development of the positive-type photo-resist forming the layer 29 following its exposure to the modulated laser light beam 22 along a spiral path on layer 29, a corresponding spiral groove will be formed in such surface with the depth of the spiral groove at locations therealong varying in accordance with the intensity of the modulated laser light beam when impinging at the respective locations along the spiral path scanned by such light beam. After the positive-type photo-resist layer 29 has been developed, the original recording disk 28 can be employed for the mass production of large numbers of corresponding video record disks by a procedure similar to that previously described for the mass production of phonograph record disks from an original lacquer record.

On the other hand, if the photo-sensitive layer 29 of original recording disk 28 is constituted by a negative-type photo-resist, upon the development of such negative-type photo-resist following its exposure to the modulated laser light beam 22 along a spiral path on the surface of layer 29, a corresponding spiral ridge will extend from the surface of layer 29 with the height of such ridge at locations along the length of the latter varying in accordance with the intensity of the modulated laser light beam when impinging at the respective locations along the spiral path scanned by such light beam. In mass producing video record disks from the last mentioned original recording disk, the surface of the developed negative-type photo-resist may be metallized and then electroplated for directly obtaining the so-called master from which a mother and then a stamper may be produced in turn by the usual techniques involved in the mass production of phonograph record disks.

Figure 5:
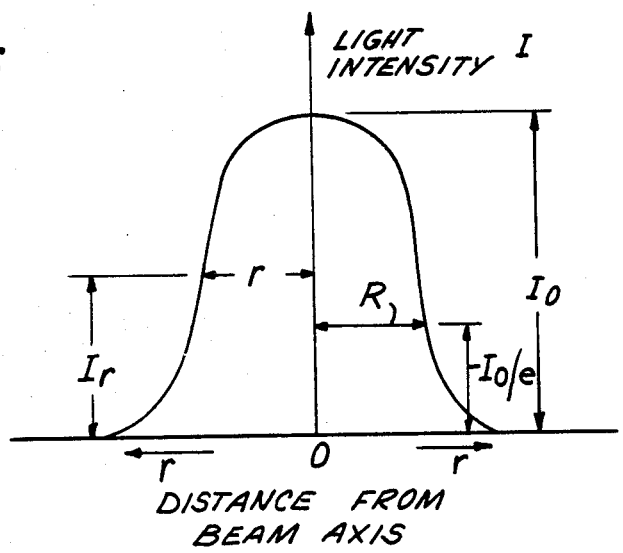
FIG. 5 is a graph illustrating the distribution of light intensity in a laser light beam which, in accordance with this invention, is used in the apparatus of FIG. 3 for producing record disks according to this invention.

In either of the above cases, that is, whether the layer 29 of original recording disk 28 is constituted by a positive- or negative-type photo-resist, when producing record disks according to this invention, the laser light beam 22 issuing from light source 21 and being modulated in accordance with the video or other information signals to be recorded, as described above, is provided with substantially a Gaussian distribution of laser light intensity across such beam, that is, in the direction transverse to the spiral path or track which is scanned on the original recording disk. More particularly, as shown on FIG. 5, the distribution of laser light intensity in the beam 22 is substantially in accordance with the equation $$I_r = I_0 \cdot \exp[-(r/R)^2] \qquad (2)$$

in which $I_r$ is the light intensity at a point spaced a radial distance r from the axis of the light beam, $I_0$ is the light intensity at the axis of the light beam, and R is the radius of the light beam at the region thereacross where the intensity is $I_0/e$ (e again being the base of the natural logarithm).

By reason of the above Gaussian distribution of the intensity of laser light in the beam 22, the degree to which the photo-resist layer 29 is photo-reacted will be similarly varied in the direction across the spiral path or track scanned by the laser light beam so that, upon development of the photo-resist layer, the resulting spiral groove in the case of a positive-type photo-resist layer, or spiral ridge in the case of a negative-type photo-resist layer, will have the desired bell-shaped cross-section with the depth or height of the groove or ridge, respectively, varying along the length thereof for representing the recorded video or other information signals.

In a particular example of the above described method according to this invention, the photo-sensitive layer 29 of the original recording disk 28 was constituted by the positive-type photo-resist available under the designation AZ-135OJ and had a thickness of 1.0 micron, and the original recording disk 28 was rotated at a speed of 1800 r.p.m. for the recording thereon of one frame of NTSC video signals during each revolution of disk 28. In such example, the laser light source 21 was an argon gas laser providing the laser light beam 22 with a wavelength of 4579 angstroms and with the desired Gaussian energy or intensity distribution across the light beam. Further, the laser light beam 22 was focussed by condensing lens 27 so as to impinge on the surface of layer 29 at a beam spot having a diameter of 3 to 4 microns, while the original or unmodulated intensity of the laser light beam and the degree of modulation thereof in response to the video signals were selected to provide the modulated laser light beam, at the axis or center of its area of impingement on layer 29, with minimum and maximum intensities of 77 milliwatts and 98 milliwatts, respectively. During such exposure of the photo-resist layer 29 on original recording disk 28, the latter was displaced in the direction of arrow 32 on FIG. 3 by a distance of about 4 microns during each revolution of the original recording disk so that the spiral path or track scanned by the laser light beam had a pitch of about 4 microns.

Figure 6:
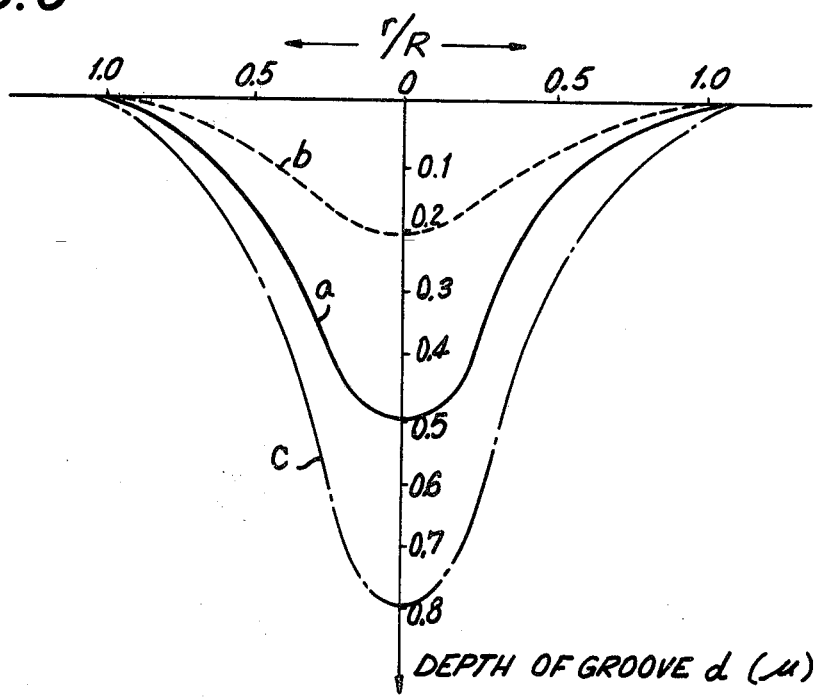
FIG. 6 is a graph illustrating variations in the cross-sectional shape with changes in depth of the groove formed in an original recording disk according to this invention for representing recorded video or other information signals.

Upon development of the positive-type photo-resist layer 29 following its exposure, as above, it was found that the resulting spiral groove had a substantially uniform width at its opening substantially corresponding to the diameter of the beam spot at which the laser light beam 22 impinged on layer 29 and a nominal depth of 0.5 microns at the median of the groove corresponding to the unmodulated intensity of laser light beam 22, as indicated by the curve a on FIG. 6, with the actual depth of the groove, at its median, varying accurately in accordance with the video signals being recorded between a minimum depth of 0.2 microns and a maximum depth of 0.8 microns, as indicated by the curves b and c on FIG. 6. As is apparent from curves a, b and c on FIG. 6, the inverted bell-shaped cross-sectional shape of the groove varies with the depth thereof at its median and, at all locations along the groove, is determined substantially by equation (1) above. It will be noted that, at least at the locations of maximum depth of the groove, as represented by the curve c on FIG. 6, the width of the groove, at its opening, is slightly greater than the diameter of the beam spot at which the laser light beam 22 impinged on layer 29 during exposure of the latter. The foregoing results from the fact that, during exposure of the photo-resist layer 29, the latter is photo-reacted slightly beyond the periphery of the beam spot particularly when the intensity of the modulated laser light beam is at its maximum value. However, due to the Gaussian distribution of the light intensities in the laser light beam in accordance with this invention, such photo-reaction of the photo-resist layer 29 beyond the periphery of the beam spot occurs in only a very small or insignificant depth of the photo-resist layer. Thus, even at the locations of maximum depth in the groove that results from development of the photo-resist layer, the opposite marginal portions of the groove are of insignificant depth so that, although the width of the groove at its opening is slightly increased at the locations of maximum groove depth, such slight relative increase in the width does not significantly influence the height of the wall separating the next adjacent grooves.

As previously mentioned, after the positive-type photo-resist layer 29 has been developed to provide the spiral groove therein having the above described characteristics, the original recording disk 28 can be employed for the mass production of large numbers of corresponding video record disks by a procedure similar to that described for the mass production of phonograph record disks from an original lacquer disk. Each of the resulting video record disks thus mass produced can have the recorded video signals reproduced therefrom by means of a piezo-electric pickup or other electro-mechanical transducer provided with a stylus tracking the spiral groove and being mechanically actuated by the variations in the depth of the groove representing the recorded video signals so as to cause the transducer to separate a corresponding electrical output. Of course, in reproducing the video signals recorded in a video record disk according to this invention, the recorded video signals may be detected optically, for example, by a laser or other light beam which is made to track the spiral groove and which is variously reflected in response to variations in the depth thereof so as to detect the recorded video signal, or such recorded video signals may be detected as variations in electrostatic capacitance.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a record disk having a continuous spiral groove of constant pitch opening at a surface of the disk with the depth of the groove varying along the latter for representing recorded information; said groove has an inverted bell-shaped cross-section which varies in accordance with the variations in said depth of the groove so as to provide a substantially uniform width of the groove at the opening of the latter regardless of the depth of said groove, and which has substantially the shape of a Gaussian distribution curve.

2. In a record disk having a continuous spiral groove opening at a surface thereof with the depth of the groove varying along the latter for representing recorded information; the width of said groove at the opening thereof being substantially uniform along the length of the groove regardless of the depth of said groove, and said groove having a cross-section which is symmetrical about the median of the groove with each of the opposite side surfaces of the groove at any location therealong being defined approximately by the equation $$d_x = d_o \cdot \exp[-(x/w)^2]$$

in which $d_o$ is the depth of the groove at said median, w is the distance from said median to the point at each of said side surfaces where the depth of the groove is $d_o/e$ (e being the base of the natural logarithm), and $d_x$ is the depth of the groove at the respective side surface at a distance x from said median.

3. In the method of optically producing a reproducible recording of information by directing a laser light beam against a substantially flat surface of a positive type photo-resist material on an original recording disk, moving the recording disk and light beam relative to each other for scanning of a spiral track of constant pitch on said recording disk by said light beam, modulating the intensity of said light beam by signals to be recorded, and developing said surface of the photo-resist material after said scanning thereof by the modulated light beam so as to form a continuous spiral groove opening at said surface with the depth of said groove varying therealong in correspondence with said signals to represent said information; the improvement of providing said laser light beam, at said surface of the photo-resist material, with substantially a Gaussian distribution of laser light intensity in the direction transverse to said spiral track which is scanned on the recording disk such that said groove which is formed thereby has substantially the shape of a Gaussian distribution curve with a substantially uniform width at the opening thereof regardless of the depth of said groove.

4. The method according to claim 3; in which said distribution of laser light intensity at said surface of the photo-resist material is substantially in accordance with the equation $$I_r = I_o \cdot \exp[-(r/R)^2]$$

in which $I_r$ is the light intensity at a point spaced a radial distance r from the axis of the light beam, $I_o$ is the light intensity at said axis of the light beam, and R is the radius of said light beam at the region thereacross where the light intensity is $I_o/e$ (e being the base of the natural logarithm).

5. The method according to claim 4; further comprising the steps of forming from said original recording disk a master, a mother and a stamper, in succession, and then molding a playable record disk by means of said stamper.

6. A playable record disk having a continuous spiral groove of constant pitch in a surface thereof with the depth of the groove varying along the latter for representing recorded information; said playable record disk being molded in correspondence with an original recording disk which is produced by directing a laser light beam against a layer of positive type photo-resist material on the original recording disk while the latter and said light beam are moved relative to each other for scanning of a spiral track of constant pitch on the original recording disk and while the intensity of said laser light beam is modulated by information signals to be recorded, with the intensity of laser light in said beam at said layer of photo-resist material having substantially a Gaussian energy distribution across said beam, and then developing said layer of photo-resist material to form a continuous spiral groove opening at the surface of said photo-resist material having the shape of a Gaussian distribution curve with a substantially uniform width at said opening thereof regardless of the depth of said groove.

7. A playable record disk according to claim 6; in which said distribution of the laser light intensity across said beam at said layer of photo-resist material is substantially in accordance with the equation $$I_r = I_o \cdot \exp[-(r/R)^2]$$

in which $I_r$ is the light intensity at a point spaced a radial distance r from the axis of said beam, $I_o$ is the light intensity at said axis of the beam, and R is the radius of the beam at the region thereacross where the light intensity is $I_o/e$ (e being the base of the natural logarithm).

* * * * *